(12) United States Patent
Bach et al.

(10) Patent No.: US 9,573,451 B1
(45) Date of Patent: Feb. 21, 2017

(54) SASHLESS DOOR SEALING ASSEMBLY, FASTENING ASSEMBLY AND METHOD

(71) Applicant: Honda Motor Co., Ltd., Tokyo (JP)

(72) Inventors: Edward W. Bach, Galloway, OH (US); Matthew Weyand Schmitt, Hilliard, OH (US); Hirokazu Matsuura, Dublin, OH (US); Teruo Yamazaki, Dublin, OH (US); Masahiro Ishikawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 14/881,201

(22) Filed: Oct. 13, 2015

(51) Int. Cl.
*B60J 10/00* (2016.01)
(52) U.S. Cl.
CPC ............... *B60J 10/84* (2016.02); *B60J 10/34* (2016.02); *B60J 10/36* (2016.02)
(58) Field of Classification Search
CPC ............. B60J 10/84; B60J 10/34; B60J 10/36
USPC ...................................................... 296/146.9
See application file for complete search history.

(56) References Cited

U.S. PATENT DOCUMENTS

| | | | |
|---|---|---|---|
| 4,238,165 A | 12/1980 | Wagner | |
| 4,266,824 A | 5/1981 | Inamoto | |
| 5,590,926 A * | 1/1997 | Nozaki | B60J 10/248 156/71 |
| 5,601,329 A | 2/1997 | Glagow et al. | |
| 5,950,366 A | 9/1999 | Uhlmeyer | |
| 6,102,467 A | 8/2000 | Laurain et al. | |
| 6,810,624 B2 | 11/2004 | Fujimura et al. | |
| 6,848,218 B2 * | 2/2005 | Langemann | B60J 10/18 296/146.9 |
| 7,083,222 B2 | 8/2006 | Oda et al. | |
| 7,344,181 B2 | 3/2008 | Koshimichi | |
| 7,434,867 B2 | 10/2008 | Matthies | |
| 8,454,291 B2 | 6/2013 | Guyomard | |
| 2007/0262608 A1 | 11/2007 | Saito | |
| 2013/0341961 A1 | 12/2013 | Mori et al. | |

* cited by examiner

*Primary Examiner* — Joseph D Pape
(74) *Attorney, Agent, or Firm* — Rankin, Hill & Clark LLP

(57) ABSTRACT

A vehicle sashless door sealing assembly, fastening assembly and method include an elongated structural member, a garnish member, and a door seal retainer disposed below the garnish assembly for holding a window pane door seal. The fastening assembly, which secures the garnish member and the door seal retainer to the elongated structural member, includes a collar having a radial flange portion interposed between the door seal retainer and an exterior surface of the garnish member and having an axial neck portion extending from the radial flange portion into a garnish aperture defined in the garnish member. The fastening assembly further includes a fastener received through a fastener aperture defined in the door seal retainer, through a fastener aperture defined in the collar and through a fastener aperture defined in the elongated structural member to thereby secure the garnish member and the door seal retainer to the elongated structural member.

20 Claims, 5 Drawing Sheets

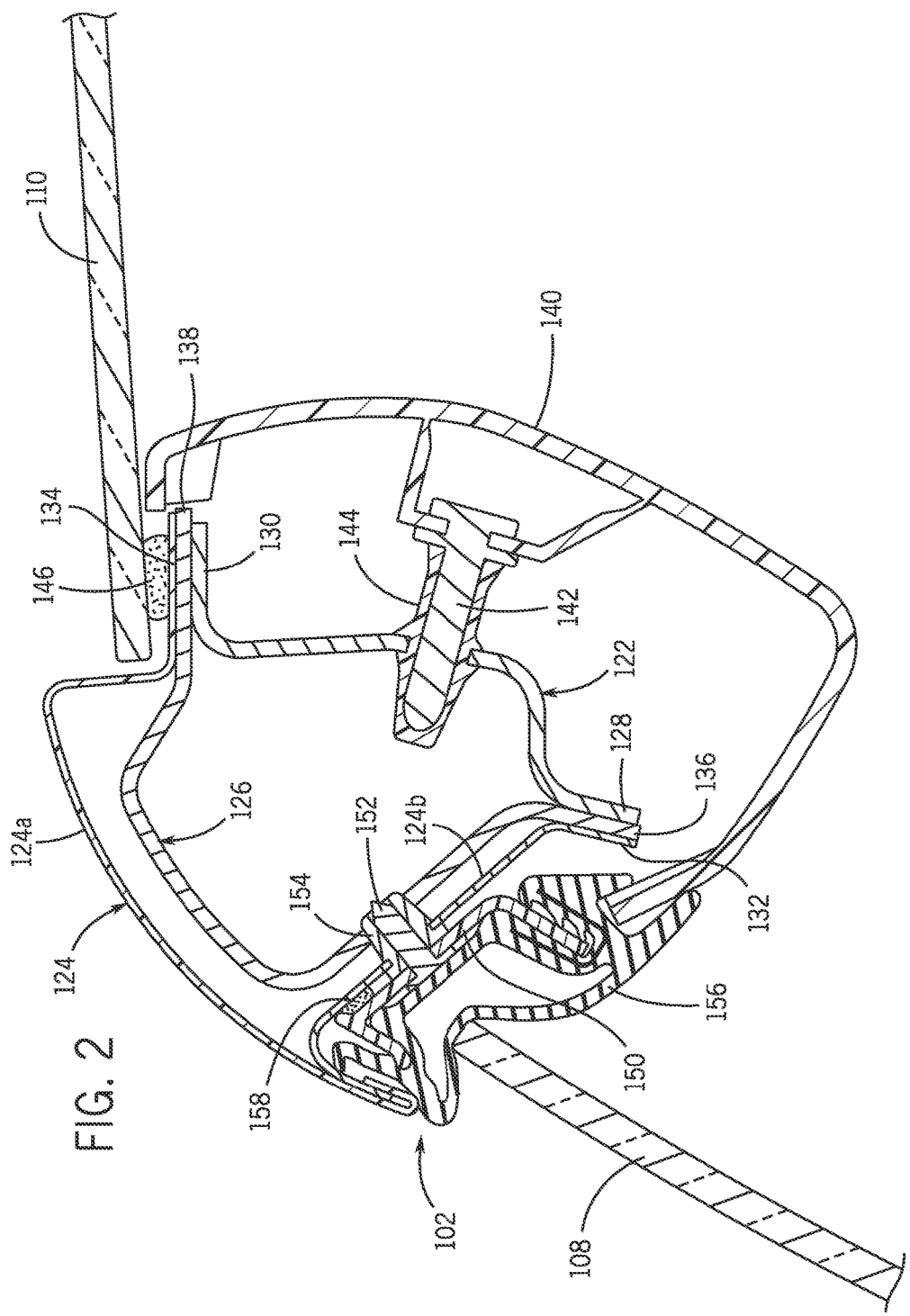

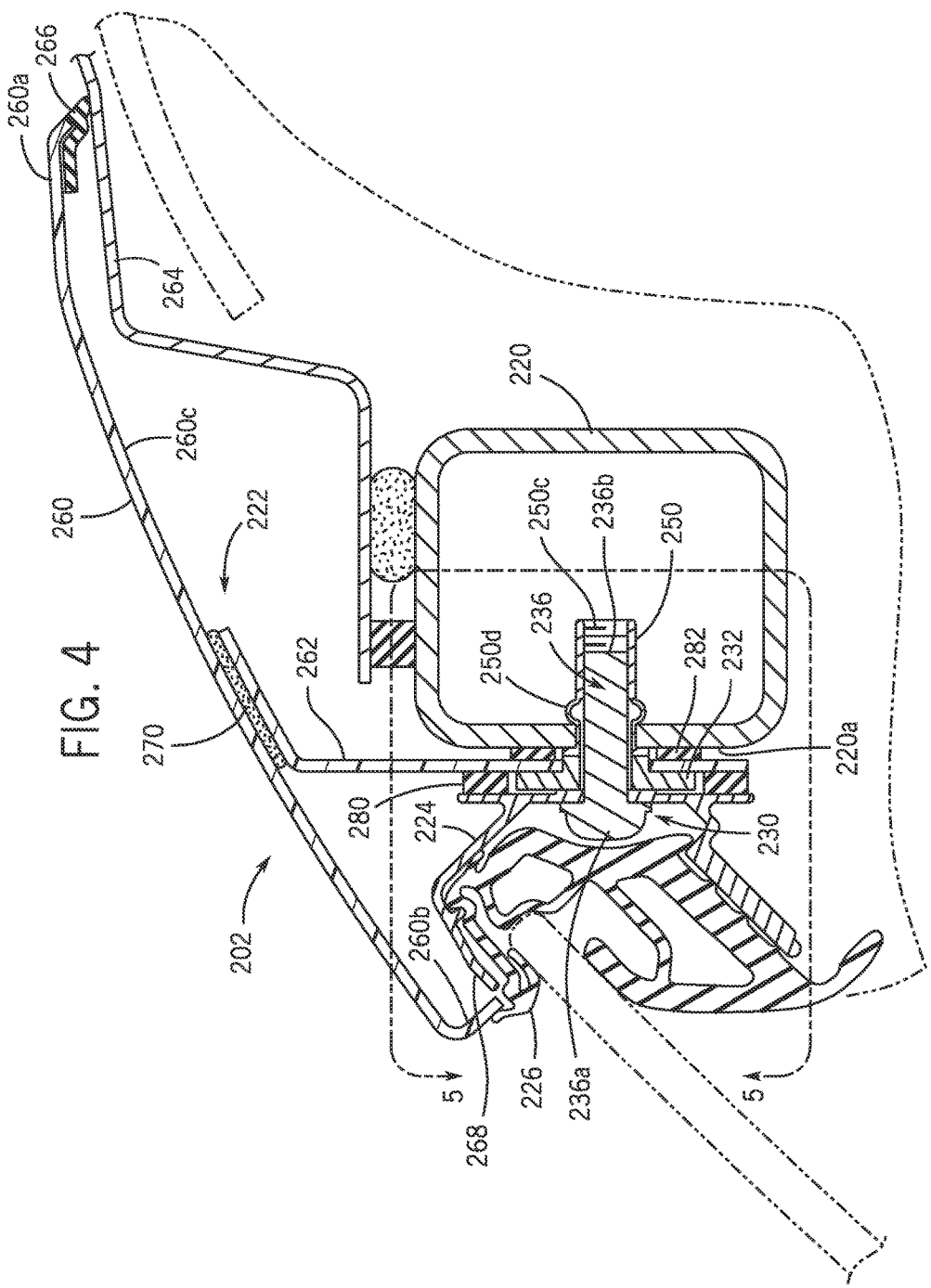

SASHLESS DOOR SEALING ASSEMBLY, FASTENING ASSEMBLY AND METHOD

BACKGROUND

Front pillars (i.e., A-pillars) on a vehicle are structural members of a body frame positioned between the windshield and the front doors. Conventionally, the front pillars support the roof structure as well and, therefore, must provide substantial support in rollover events. At the same time, the front pillars lie within sight lines of the vehicle operator and need to have a minimal profile to allow the operator to maintain proper vision with respect to the front pillars. Thus, there can be conflicting requirements with respect to the design of the front pillars. To provide a strong structural member for the body frame, each front pillar needs to have a maximum cross-sectional configuration, yet maintain a minimal cross-section for vision purposes.

Commonly, each front pillar is formed as a structural member having a closed cross-section by welding together an outer panel and an inner panel in an overlapping manner. Each of the outer panel and the inner panel typically includes weld flanges for joining the other. The weld flanges also provide for a sealing relationship with respect to both the windshield and the front door that are supported on the front pillars. However, because the weld flanges project outwardly from each front pillar, the traditional flange formation can be restrictive and can result in a correspondingly narrower field of view for the operator from within the passenger compartment.

In conventional vehicle construction, a separate roof rail member is secured at its forward end to an upper end of the front pillar (i.e., on each lateral side of the vehicle). The front pillar and the roof rail together define the forward side and the upper side of a vehicle door opening for ingress and egress to and from the passenger compartment. Like the front pillar, commonly, each roof rail is formed as a structural member having a closed cross-section by welding together an outer panel and an inner panel in an overlapping manner. Each of the outer panel and the inner panel typically includes weld flanges for joining the other. The weld flanges also provide for a sealing relationship with the front door and typically are connected to the roof provided on the vehicle.

Within the door opening, typically one of two types of doors is used, including a door with a sash and a door without a sash. When a door with a sash is used, the sash typically carries one seal that sealingly engages against the outer panel of the A-pillar and the outer panel of the roof rail. A second seal can be provided along the outer-most weld flange of the front pillar and the roof rail for sealingly engaging the sash on the vehicle door. When a door without a sash is used, a seal is typically provided along and connected to the outer panel members, respectively, of the front pillar and the roof rail. This seal then sealingly engages a distal end of the window pane of the sashless door. Thus, for the sashless door, only a single seal is used between the vehicle door and each of the front pillar and roof rail. In conventional designs, sashless door constructions generally apply the same material to all of the involved parts. In addition, the roof and/or windshield are not typically involved in conventional sashless door constructions because the roof and/or windshield are applied to the inner weld flange between the outer panel member and the inner panel member of each of the front pillars and the roof rails.

BRIEF DESCRIPTION

According to one aspect, a sashless door sealing assembly on a vehicle includes an elongated structural member extending along a door opening of the vehicle, a garnish member disposed on an exterior side of the elongated structural member, and a door seal retainer disposed on the exterior side of the elongated structural member below the garnish assembly for holding a window pane door seal. The sashless door sealing assembly further includes a fastening assembly for securing the garnish member and the door seal retainer to the elongated structural member. The fastening assembly includes a collar having a radial flange portion interposed between the door seal retainer and an exterior surface of the garnish member and having an axial neck portion extending from the radial flange portion into a garnish aperture defined in the garnish member. The fastening assembly further includes a fastener received through a fastener aperture defined in the door seal retainer, through a fastener aperture defined in the collar and through a fastener aperture defined in the elongated structural member to thereby secure the garnish member and the door seal retainer to the elongated structural member.

According to another aspect, a fastening assembly for securing a garnish member and a door seal retainer to an elongated structural member includes a fastener received through a fastener aperture defined in the door seal retainer, through a fastener aperture defined in the garnish member and through a fastener aperture defined in the elongated structural member to thereby secure the door seal retainer and the garnish member to the elongated structural member. The assembly further includes a collar having a radial flange portion positioned between the door seal retainer and the garnish member, and having a neck portion extending annularly from the radial flange portion to define a fastener aperture in the collar into which the fastener is received, wherein the neck portion of the collar extends toward the elongated structural member and into the fastener aperture defined in the garnish member.

According to a further aspect, a method for securing a garnish member and a door seal retainer to an elongated structural member that extends along a door opening of a vehicle is provided. According to the method, an axial neck portion of a collar is inserted into a garnish aperture defined in the garnish member. The garnish member is positioned relative to the elongated structural member such that a fastener aperture defined by the collar is in registry with a fastener aperture defined in the elongated structural member and the garnish member is positioned on an exterior side of the elongated structural member. The door seal retainer is positioned relative to the elongated structural member such that a fastener aperture of the door seal retainer is in registry with the fastener apertures of the garnish member in the elongated structural member and a radial flange portion of the collar from which the axial neck portion extends is positioned between the door seal retainer and the garnish member. A fastener is installed into the fastener apertures of the door seal retainer, the garnish member and the elongated structural member to thereby secure the garnish member and the door seal retainer to the elongated structural member.

BRIEF DESCRIPTION OF THE DRAWINGS

FIG. 2 is a cross-sectional view of a known elongated structural member defining a door opening on a vehicle taken along the line 2-2 of FIG. 1.

FIG. 4 is a cross-sectional view corresponding to the line 4-4 of FIG. 3.

DETAILED DESCRIPTION

It should, of course, be understood that the description and drawings herein are merely illustrative and that various modifications and changes can be made in the structures disclosed without departing from the present disclosure. In general, the figures in the exemplary vehicle body are not necessarily to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It is also to be appreciated that the various identified components of the exemplary vehicle body and the elongated structural member disclosed herein are merely terms of art that may vary from one manufacturer to another and should not be deemed to limit the present disclosure.

Figure 1:
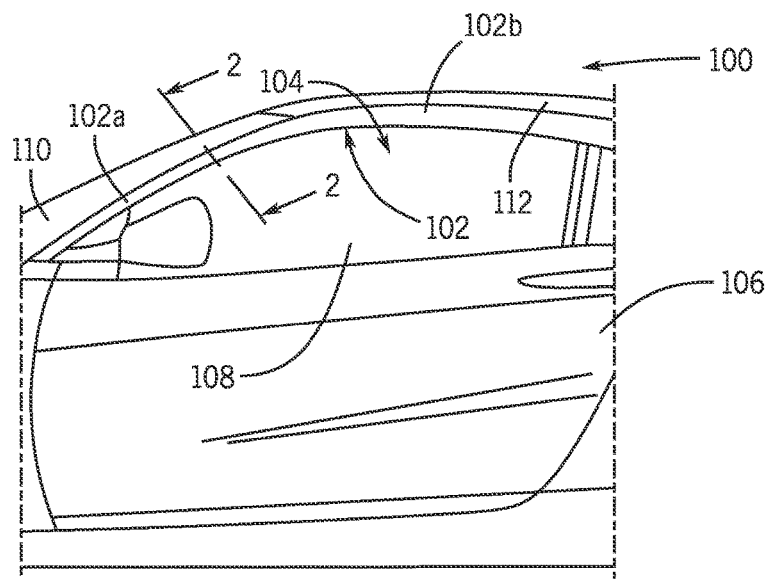
FIG. 1 is a schematic view of a front left section of a vehicle body.

Referring now to the specific drawings, wherein the showings are for purposes of illustrating the exemplary embodiments only and not for purposes of limiting the same, FIG. 1 depicts a side section of a vehicle body frame 100. The vehicle body frame 100 includes left and right elongated structural assemblies (only left elongated structural assembly 102 is visible). Each elongated structural member extends along a door opening (only left door opening 104 is visible) that is opened or closed by a front door (only left front door 106 and left front door window pane 108 are depicted). In particular, the elongated structural members form upper portions of the front or A-pillars of the vehicle and at least forward portions of the roof rails of the vehicle.

More particularly, a forward or lower portion of the elongated structural assembly (e.g., lower portion 102a of member the elongated structural assembly 102) is disposed so as to extend at an incline rearwards and upwards to form an upper forward portion of the door opening and a rearward portion (e.g., rearward portion 102b of the elongated structural assembly 102) extends rearward from an upper end of the forward portion to define the roof rail over the door opening. A windshield 110 is mounted between the left and right elongated structural members, and a roof structure 112 is at least partially supported by the elongated structural members. With additional reference to FIG. 2, the elongated structural assembly 102 is shown in cross-section, and particularly corresponds with a known elongated structural assembly. Because the left and right known elongated structural assemblies are bilaterally symmetrical to each other, a further description will be given hereafter for the known elongated structural member 102 only and a description for the known right elongated structural member will be omitted.

The known elongated structural assembly 102 of FIG. 2 can be referred to as a sashless door sealing assembly for the reasons that will become apparent upon reading the description below. As shown, the assembly 102 is typically formed of an inner panel member 122 and an outer panel member 124. A reinforcement member 126 is interposed between the inner and outer members 122, 124. The inner member 122 is formed with opposing weld flanges 128, 130. Likewise, the outer member 124 has mating weld flanges 132, 134 which are welded to the flanges 128, 130 of the inner member 122 to form a generally hollow extending structural beam. Similarly, the reinforcement member 126 can include weld flanges 136, 138 that are, respectively, interposed between the corresponding flanges 128, 132 and 130, 134. An inner cover 140 can be disposed inwardly of the known assembly 102 in the vehicle passenger compartment or cabin (not shown) and can be fastened to the inner member 122 such as via the illustrated clip 142 and spacer member 144. The windshield 110 is adhered to the outer member 124, in particularly the weld flange 134 of the outer member 124, via an adhesive 146.

Also secured to the outer member 124 is a door seal retainer 150. In particular, a clip 152 secures the door seal retainer 150 to the outer member 124 together with a spacer member 154. As is well known in the art, a seal 156 is carried by the door seal retainer 150. As the known elongated structural assembly 102 is a sashless door sealing assembly, the seal 156 seals directly to the window pane 108 of the vehicle door 106. Accordingly, no sash is included on the door 106 and thus sealing occurs directly between the window pane 108 and the seal 156 that is mounted to the vehicle body frame 100. An adhesive 158 can be applied between the door seal retainer 150 and the outer member 124 particularly on a "wet side" of the clip 152 (i.e., the side of the clip 152 exposed to weather). In the illustrated known elongated structural assembly 102, it is noted that the outer member 124 is formed of a first panel section 124a and a second panel section 124b, however it is to be appreciated that the outer member 124 could be formed from a single sheet of material.

Figure 3:
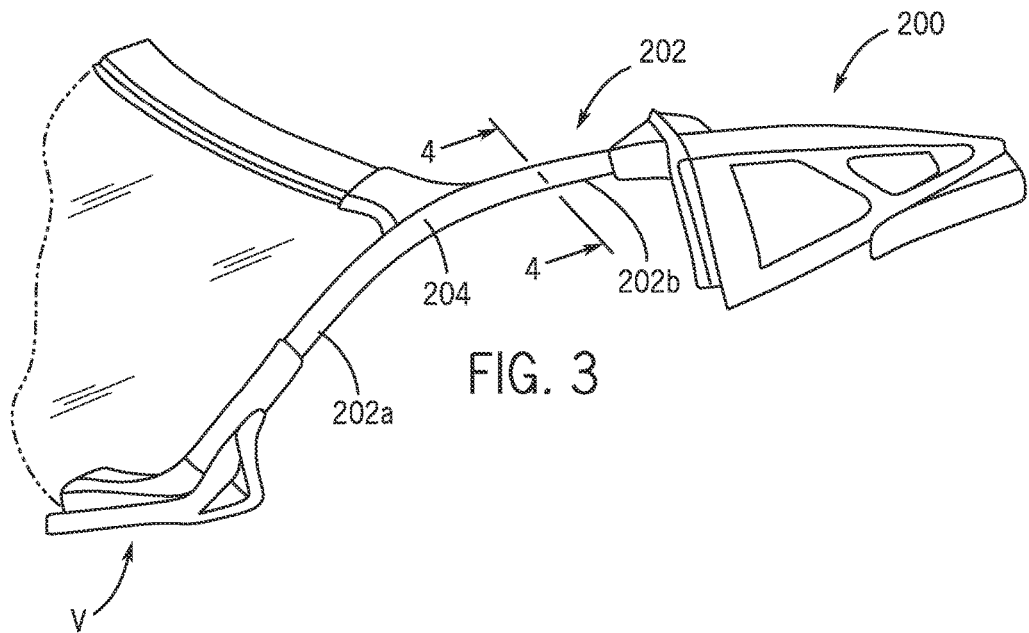
FIG. 3 is a schematic view of an exemplary vehicle body including an elongated structural member that extends along a door opening of a vehicle.

With reference now to FIG. 3, a vehicle body frame 200 for a vehicle V according to an exemplary embodiment comprises left and right elongated structural members (only left elongated structural assembly 202 is visible). Each elongated structural assembly defines a door opening (only left door opening 204 is visible). Again, because the left and right exemplary elongated structural assemblies are bilaterally symmetrical to each other, a description will be given hereafter for the exemplary left elongated structural assembly 202 only and a description for the exemplary right elongated structural assembly will be omitted. The exemplary left elongated structural assembly will hereafter be referred to simply as the elongated structural assembly.

The elongated structural assembly 202 includes an upper or a forward portion 202a that extends at an incline rearwards and upwards to form an upper forward portion of the door opening 204 and a rearward portion 202b that forms an upper most portion of the door opening 204. The elongated structural assembly 202 can be referred to as a sashless door sealing assembly on a vehicle as it is provided for use with a sashless vehicle door, (e.g., door 106 having window pane 108 and no sash).

With additional reference to FIG. 4, which illustrates a cross-section corresponding to the line 4-4 of FIG. 3, the elongated structural assembly 202 includes a tubular (i.e., hollow) elongated structural member 220 extending along the door opening 204, a garnish member 222 disposed on an exterior surface or side 220a of the elongated structural member 220 and a door seal retainer 224 disposed on the exterior side 220a of the elongated structural member 220 below the garnish member 222 for holding a window pane door seal 226. The elongated structural assembly 202 additionally includes a fastening assembly 230 for securing the garnish member 222 and the door seal retainer 224 to the elongated structural member 220.

Figure 5:
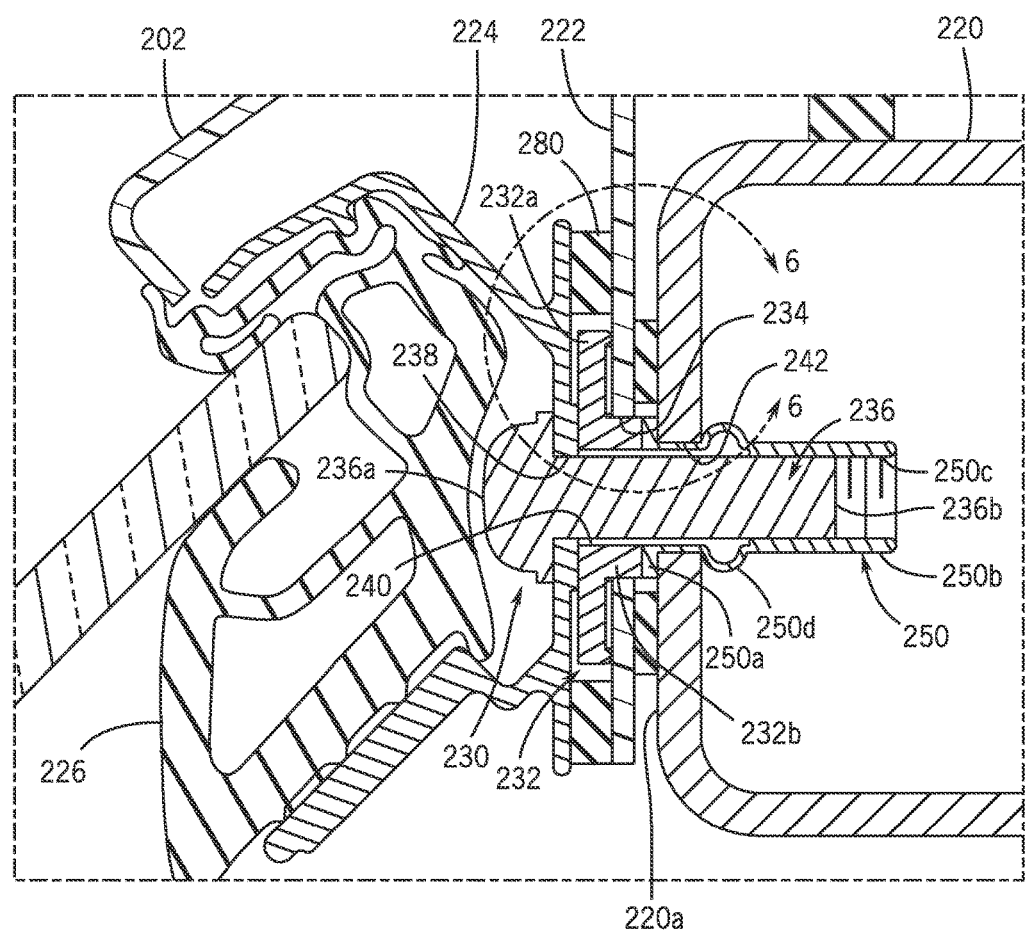
FIG. 5 is a partial enlarged view taken along the line 5-5 of FIG. 4.
Figure 6:
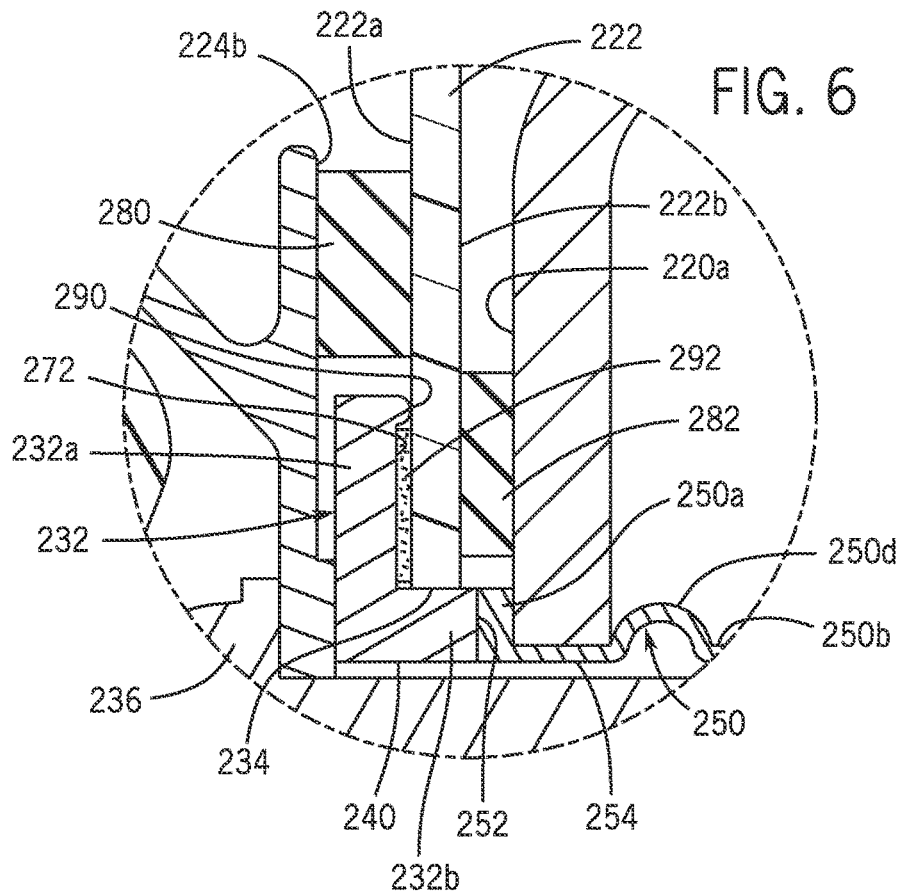
FIG. 6 is a partial enlarged view taken along the line 6-6 of FIG. 5.

With additional reference to FIGS. 5 and 6, in the illustrated embodiment, the fastening assembly 230 includes a collar 232 having a radial flange portion 232a interposed between the door seal retainer 224 and an exterior side 220a of the garnish member 222 and having an axial neck portion 232b extending from the radial flange portion 232a into a garnish aperture 234 defined in the garnish member 222. The fastening assembly 230 further includes a fastener 236 (e.g., a bolt, such as a shoulder bolt) received through a fastener aperture 238 defined in the door seal retainer 224, through a fastener aperture 240 defined in the collar 232 and through a fastener aperture 242 defined in the elongated structural member 220 to thereby secure the garnish member 222 in the door seal retainer 224 to the elongated structural member 220.

The fastening assembly 230 can additionally include a sleeve member 250 that includes a radial flange portion 250a and an axial neck portion 250b. As shown in the illustrated embodiment, the radial flange portion 250a can be interposed between a distal axial end 252 of the axial neck portion 232b of the collar 232 and the exterior side 220a of the elongated structural member 220. The axial neck portion 250b extends from the radial flange portion 250a into the fastener aperture 242 defined in the elongated structural member 220. The sleeve member 250 defines a fastener aperture 254 that receives the fastener 236 to retain the fastener 256 to the elongated structural member 220 and thereby the garnish member 222 and the door seal retainer 224 to the elongated structural member 220. The sleeve member 250 can be a rivet nut that includes interior threads 250c disposed on the axial neck portion 250b within the fastener aperture 254 of the rivet nut 250 and includes a bulged portion 250d along the axial neck portion 250b for securing the rivet nut 250 to the elongated structural member 220.

More particularly, the rivet nut 250 can be first installed into the elongated structural member 220 by first inserting the rivet nut 250 into the fastener aperture 242 and then forcibly deforming the rivet nut 250 to create the bulged portion 250d and thereby securing the rivet nut 250 to the elongated structural member 220. As shown, the fastener 236 can include a head portion 236a disposed against an exterior surface 224a of the door seal retainer 224 and a threaded shaft portion 236b threadedly secured to the interior threads 250c of the rivet nut 250 to mount the door seal retainer 224 and the garnish member 222 to the elongated structural member 220.

In the illustrated embodiment, the garnish member 222 is formed of two sections including an exterior section or portion 260 and an interior portion or section 262. The exterior portion 260 has an upper end 260a sealed to a roof panel 264 via a seal 266 and a lower end 260b overlapping an upper flange 268 of the door seal retainer 224 and sealingly engaged via the seal 226. The interior portion 262 is arranged to depend downward from an inner side 260c of the exterior portion 260 at a location between and spaced apart from the upper and lower ends 260a, 260b of the exterior portion 260. The interior portion 262 is interposed between the door seal retainer 224 and the elongated structural member 220. More particularly, in the illustrated embodiment, the interior portion 262 of the garnish member 222 can be secured to the inner side 260c of the exterior portion 260 via an adhesive 270 thereby providing the exterior and interior portions 260, 262 as an integral member in the form of the garnish member 222. As shown, the interior portion 262 of the garnish member 222 is interposed between an underside 272 (FIG. 6) of the radial flange portion 232a of the collar 232 and the exterior side 220a of the elongated structural member 220.

The fastening assembly 230 can additionally include a first seal 280 positioned or interposed between an underside 224b of the door seal retainer 224 and the exterior side 222a of the garnish member 222 at a location radially outward relative to the radial flange portion 232a of the collar 232. The first seal 280 can be in the form of a strip seal (not shown) that is elongated with a plurality of mounting apertures defined therealong (only one mounting aperture 280a shown) at each mounting location along the elongated structural member 220. A second seal 282 can be positioned or interposed between an inner surface 222b of the garnish member 222 and the exterior surface 220a of the elongated structural member 220 at a location radially outward relative to the axial neck portion 232b of the collar 232. Like the first seal 280, the second seal 282 can be a strip seal that defines a plurality of mounting apertures (only one mounting aperture 282a shown) at each mounting location along the elongated structural member 220.

As best shown in FIGS. 5 and 6, the collar 232 includes an annularly depending flange or lip 290 depending from the underside 272 thereof. The lip 290, also referred to herein as an annular lip, is radially spaced apart from the axial neck portion 232b with an adhesive 292 radially interposed between the lip 290 and the axial neck portion 232b of the collar 232 for adhering the collar 232 to the exterior surface 220a of the garnish member 222. The lip 290 maintains a minimum axial spacing between the radial flange portion 232a of the collar 232 and the exterior side 222a of the garnish member 222.

In the exemplary embodiment, the elongated structural member 220 and the door seal retainer 224 are metal, whereas the garnish member 222 is non-metallic, such as being formed of plastic, carbon fiber, a composite, etc. In particular, the elongated structural member 220 can be formed of steel and the door seal retainer 224 formed of aluminum. Advantageously, the fastening assembly 230 provides a metallic link between the door seal retainer 224 and the elongated structural member 220. In particular, each of the collar 232, the fastener 236 and the sleeve member 250 can be formed of metal and/or have a corrosion resistant coating applied. The collar 232 and the sleeve member 250 form a metallic link between the door seal retainer 224 and the elongated structural member 220. The all metal contact prevents joint creep and the resulting torque loss that could otherwise occur if a non-metal material was located in between. The seals and special coatings prevent corrosion concerns that would otherwise be present for multi-material joints.

The inclusion of the garnish member 222 creates extra water leak concerns that do not exist in the known sashless assemblies, such as the one discussed hereinabove. These potential water leak concerns are also potential corrosion concerns due to the dissimilar materials being secured together. Still further, due to the less rigid construction of the garnish member, there is also a torque loss concern due to the thermal expansion and creep of the garnish member 222. Advantageously, the collar 232 eliminates any joint creep that might occur and possibly create torque loss over time. The lip 290 on the collar 232 maintains the gap as already described. This prevents deformation of the garnish member 222 and maintains a better appearance.

Figure 7:
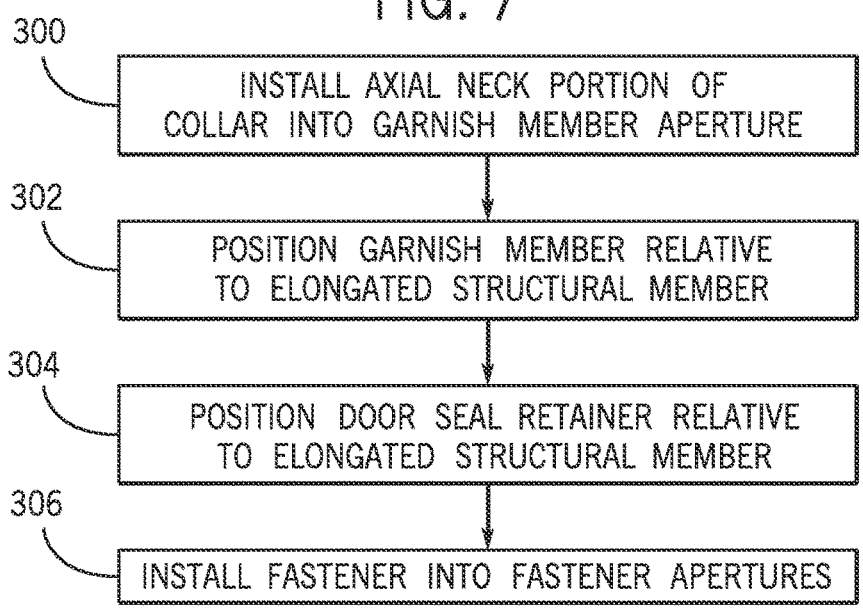
FIG. 7 is a block diagram illustrating a method for securing a garnish member and a door seal retainer to an elongated structural member according to an exemplary embodiment.

With reference now to FIG. 7, a method for securing a garnish member and a door seal retainer to an elongated structural member that extends along the door opening of a vehicle will be described. In particular, the method will be described in reference to the sashless door sealing assembly 202 and its fastening assembly 230 described hereinabove, though it is to be appreciated that the method could be used with other sashless door sealing assemblies and/or fastening assemblies. In the method, at 300, the axial neck portion 232b of the collar 232 is inserted into the aperture 234 defined in the garnish member 222. The garnish member 222 is positioned relative to the elongated structural member at 302 such that the fastener aperture 240 defined by the collar 232 is in registry with the fastener aperture of 242 defined in the elongated structural member 220 and the garnish member 222 is positioned on the exterior side 228 of the elongated structural member 220. At 304, the door seal retainer 224 is then positioned relative to the elongated structural member 220 such that the fastener aperture 238 of the door seal retainer 224 is in registry with the fastener apertures 240, 242 of the garnish member 222 and the elongated structural member 220 and the radial flange portion 232a of the collar 232 from which the axial neck portion 232b extends is positioned between the door seal retainer 224 and the garnish member 222.

Finally, at 306, the fastener 236 is installed into the fastener apertures 238, 240, 242 of the door seal retainer 224, the garnish member 222 and the elongated structural member 220 to thereby secure the garnish member 222 and the door seal retainer 224 to the elongated structural member 220. Though not shown in FIG. 7, the method can additionally include installing the rivet nut 250 into the fastener aperture 242 of the elongated structural member 220 and threadedly connecting the fastener 236 with the rivet nut 250 when installing the fastener 236 into the fastener apertures 238, 240, 242. Still further, the method can include positioning the seal 282 between the elongated structural member 220 and the garnish member 222 to seal annularly around the fastener apertures 234,242 of the garnish member 222 and the elongated structural member 220. Also, the method can include positioning the seal 280 between the door seal retainer 224 and the garnish member 222 to seal annularly around the fastener apertures 238, 234 of the door seal retainer 224 and the garnish member 222. Further, the method can include installing the adhesive 292 within an axial gap defined axially between the underside 272 of the radial flange portion 232a of the collar 232 and the garnish member 222 and defined radially between the axial neck portion 232b of the collar 232 and the lip 290 extending from a distal radial end of the radial flange portion 232a of the collar 232.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A sashless door sealing assembly on a vehicle, comprising:
   an elongated structural member extending along a door opening of the vehicle;
   a garnish member disposed on an exterior side of the elongated structural member;
   a door seal retainer disposed on the exterior side of the elongated structural member below the garnish member for holding a window pane door seal; and
   a fastening assembly for securing the garnish member and the door seal retainer to the elongated structural member, the fastening assembly including:
      a collar having a radial flange portion interposed between the door seal retainer and an exterior surface of the garnish member and having an axial neck portion extending from the radial flange portion into a garnish aperture defined in the garnish member, and
      a fastener received through a fastener aperture defined in the door seal retainer, through a fastener aperture defined in the collar and through a fastener aperture defined in the elongated structural member to thereby secure the garnish member and the door seal retainer to the elongated structural member.

2. The sashless door sealing assembly of claim 1 wherein the elongated structural member and the door seal retainer are metal and the garnish member is non-metallic.

3. The sashless door sealing assembly of claim 2 wherein the elongated structural member is formed of steel and the door seal retainer is formed of aluminum.

4. The sashless door sealing assembly of claim 1 wherein the fastening assembly further includes:
   a sleeve member including a radial flange portion and an axial neck portion, the radial flange portion interposed between a distal end of the axial neck portion of the collar and the exterior side of the elongated structural member, the axial neck portion extending from the radial flange portion into the fastener aperture defined in the elongated structural member, the sleeve member defining a fastener aperture that receives the fastener to retain the fastener to the elongated structural member and thereby the garnish member and the door seal retainer to the elongated structural member.

5. The sashless door sealing assembly of claim 4 wherein the sleeve member is a rivet nut that includes interior threads disposed on the axial neck portion within the fastener aperture of the rivet nut and includes a bulged portion along the axial neck portion for securing the rivet nut to the elongated structural member.

6. The sashless door sealing assembly of claim 1 wherein the fastener includes a head portion disposed against an exterior surface of the door seal retainer and a threaded shaft portion threadedly secured to mount the door seal retainer and the garnish member to the elongated structural member.

7. The sashless door sealing assembly of claim 1 wherein the garnish member includes:
   an exterior portion having an upper end sealed to a roof panel and a lower side overlapping an upper flange of the door seal retainer; and
   an interior portion depending downward from an inner side of the exterior portion at a location between the upper and lower ends of the exterior portion, a lower portion of the interior portion interposed between the door seal retainer and the elongated structural member.

8. The sashless door sealing assembly of claim 7 wherein the interior portion of the garnish member is interposed between an underside of the radial flange portion of the collar and the exterior side of the elongated structural member.

9. The sashless door sealing assembly of claim 1 wherein the fastening assembly further includes:
   a seal interposed between an underside of the door seal retainer and the exterior side of the garnish member.

10. The sashless door sealing assembly of claim 9 wherein the collar includes an annular lip depending from the underside thereof, the lip radially spaced apart from the axial neck portion with an adhesive radially interposed between the lip and the axial neck portion of the collar for adhering the collar to the exterior surface of the garnish member, the lip maintaining a minimum spacing between the radial flange portion of the collar and the exterior surface of the garnish member.

11. A fastening assembly for securing a garnish member and a door seal retainer to an elongated structural member, comprising:
- a fastener received through a fastener aperture defined in the door seal retainer, through a fastener aperture defined in the garnish member and through a fastener aperture defined in the elongated structural member to thereby secure the door seal retainer and the garnish member to the elongated structural member; and
- a collar having a radial flange portion positioned between the door seal retainer and the garnish member, and having a neck portion extending annularly from the radial flange portion to define a fastener aperture in the collar into which the fastener is received, the neck portion of the collar extending toward the elongated structural member and into the fastener aperture defined in the garnish member.

12. The fastening assembly of claim 11 further including a sleeve member having a radial flange portion and a neck portion, the radial flange portion positioned between garnish member and an exterior surface of the elongated structural member, the neck portion extending form the radial flange portion into the fastener aperture defined in the elongated structural member.

13. The fastening assembly of claim 12 wherein the collar and the sleeve member form a metallic link between the door seal retainer and the elongated structural member.

14. The fastening assembly of claim 12 wherein the radial flange portion is also positioned between a distal end surface of the neck portion of the collar and the exterior surface of the elongated structural member.

15. The fastening assembly of claim 11 further including:
- a first seal positioned between an inner surface of the door seal retainer and an exterior surface of the garnish member at a location radially outward relative to the radial flange portion of the collar; and
- a second seal positioned between an inner surface of the garnish member and the exterior surface of the elongated structural member at a location radially outward relative to the neck portion of the collar.

16. A method for securing a garnish member and a door seal retainer to an elongated structural member that extends along a door opening of a vehicle, comprising:
- inserting an axial neck portion of a collar into a garnish aperture defined in the garnish member;
- positioning the garnish member relative to the elongated structural member such that a fastener aperture defined by the collar is in registry with a fastener aperture defined in the elongated structural member and the garnish member is positioned on an exterior side of the elongated structural member;
- positioning the door seal retainer relative to the elongated structural member such that a fastener aperture of the door seal retainer is in registry with the fastener apertures of the garnish member and the elongated structural member and a radial flange portion of the collar from which the axial neck portion extends is positioned between the door seal retainer and the garnish member; and
- installing a fastener into the fastener apertures of the door seal retainer, the garnish member and the elongated structural member to thereby secure the garnish member and the door seal retainer to the elongated structural member.

17. The method of claim 16 wherein the elongated structural member and the door seal retainer are metal and the garnish member is non-metallic.

18. The method of claim 16 further including:
- installing a rivet nut into the fastener aperture of the elongated structural member and threadedly connecting the fastener with the rivet nut when installing the fastener into the fastener apertures.

19. The method of claim 16 further including:
- positioning a first seal between the door seal retainer and the garnish member to seal annularly around the fastener apertures of the door seal retainer and the garnish member; and
- positioning a second seal between the elongated structural member and the garnish member to seal annularly around the fastener apertures of the garnish member and the elongated structural member.

20. The method of claim 16 further including:
- installing adhesive within an axial gap defined axially between an underside of radial flange portion of the collar and the garnish member and defined radially between the axial neck portion of the collar and an annular depending flange extending from a distal radial end of the radial flange portion of the collar.

* * * * *